US009958208B2

(12) United States Patent
Morales et al.

(10) Patent No.: US 9,958,208 B2
(45) Date of Patent: May 1, 2018

(54) CONTROL PROCESS FOR AN ANODE BAKING FURNACE AND ADAPTED FURNACE USING SUCH PROCESS

(75) Inventors: François Morales, Montvernier (FR); Alain De La Torre, Saint Jean de Maurienne (FR)

(73) Assignee: Rio Tinto Alcan International Limited, Montreal (CA)

(*) Notice: Subject to any disclaimer, the term of this patent is extended or adjusted under 35 U.S.C. 154(b) by 774 days.

(21) Appl. No.: 13/377,703

(22) PCT Filed: Jun. 7, 2010

(86) PCT No.: PCT/FR2010/000413
§ 371 (c)(1),
(2), (4) Date: Dec. 12, 2011

(87) PCT Pub. No.: WO2010/128226
PCT Pub. Date: Nov. 11, 2010

(65) Prior Publication Data
US 2012/0097154 A1    Apr. 26, 2012

(30) Foreign Application Priority Data
Jun. 15, 2009  (FR) .................................... 09 02895

(51) Int. Cl.
*F24C 3/00* (2006.01)
*F27D 19/00* (2006.01)
(Continued)

(52) U.S. Cl.
CPC ............. *F27D 19/00* (2013.01); *F23N 5/022* (2013.01); *F27B 13/14* (2013.01); *F27D 21/00* (2013.01); *Y02P 10/262* (2015.11)

(58) Field of Classification Search
CPC ...................................................... F23N 5/022
(Continued)

(56) References Cited

U.S. PATENT DOCUMENTS 1,330,175 A *  2/1920  Doerschuk .................... 432/169
3,744,959 A     7/1973  Nedopil et al.
(Continued)

FOREIGN PATENT DOCUMENTS

EP  1070224 B1   5/2003
FR  2600152 A1  12/1987
(Continued)

OTHER PUBLICATIONS

International Search Report and Written Opinion dated Aug. 19, 2010 (PCT/FR2010/000413); ISA/EP.

*Primary Examiner* — Alissa Tompkins
*Assistant Examiner* — John Bargero
(74) *Attorney, Agent, or Firm* — Banner & Witcoff, Ltd.

(57) ABSTRACT

Control process for a furnace for baking carbon anodes comprising:
longitudinal hollow partitions in each of which a flow of hot baking gas may circulate, hollow partitions together defining cells to receive the anodes to be baked,
and a heating system rotating in relation to the hollow partitions comprising an upstream blowing ramp blowing air into the various partitions, a downstream suction ramp sucking gas from the various partitions and at least one heating ramp.
This process comprises a natural pre-heating phase of the partitions and anodes which release combustible, volatile matter which burns inside the hollow partitions as a degassing in a natural pre-heating zone of the furnace downstream of the heating ramp. According to the invention, gas flows circulating in the hollow partitions are modified so as to control gas flows passing through a first natural pre-heating zone from gas flows leaving a second natural pre-heating zone to control the location of the degassing front.

25 Claims, 6 Drawing Sheets

(51) Int. Cl.
 *F23N 5/02* (2006.01)
 *F27B 13/14* (2006.01)
 *F27D 21/00* (2006.01)

(58) Field of Classification Search
 USPC .............................................. 126/85 R; 432/1
 See application file for complete search history.

(56) References Cited

U.S. PATENT DOCUMENTS

| | | |
|---|---|---|
| 4,859,175 A | 8/1989 | Dreyer et al. |
| 6,339,729 B1 | 1/2002 | Dreyer et al. |
| 6,436,335 B1 | 8/2002 | Leisenberg |
| 7,194,983 B2 * | 3/2007 | Kokko .......................... 122/4 D |

FOREIGN PATENT DOCUMENTS

| | | | |
|---|---|---|---|
| FR | 2614093 A2 | 10/1988 | |
| FR | 2777072 A1 | 10/1999 | |
| WO | 9119147 A1 | 12/1991 | |
| WO | WO 9119147 A1 * | 12/1991 | ............. F23N 5/003 |

\* cited by examiner

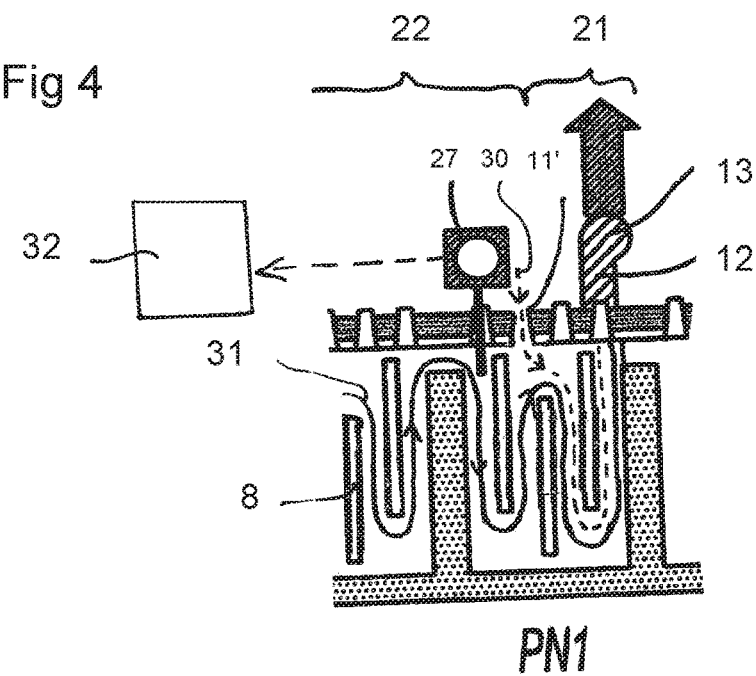
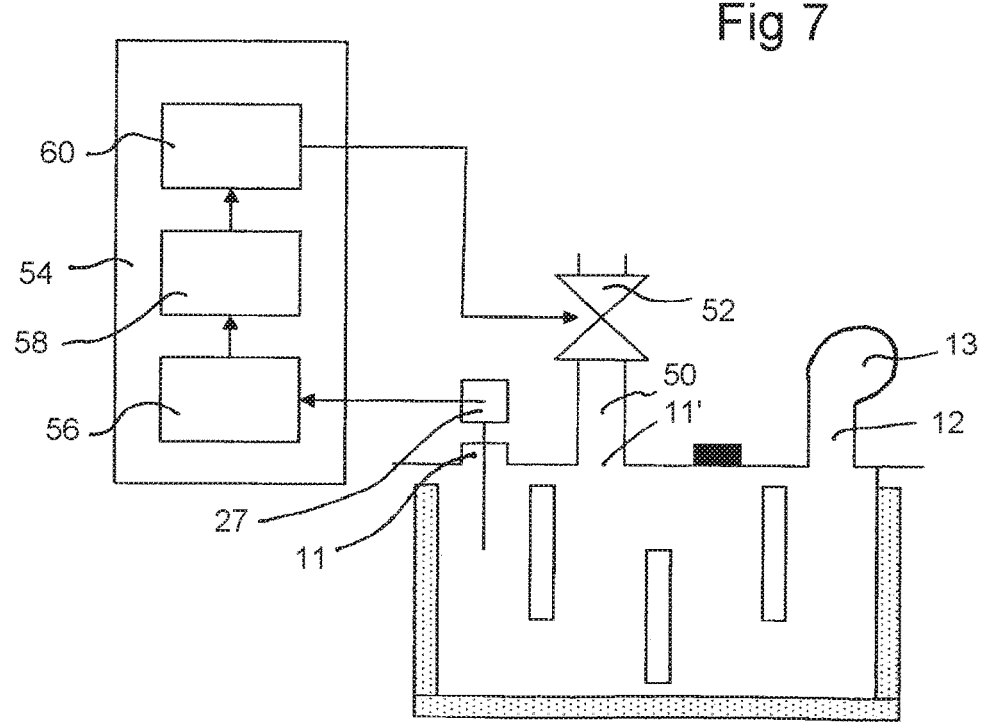

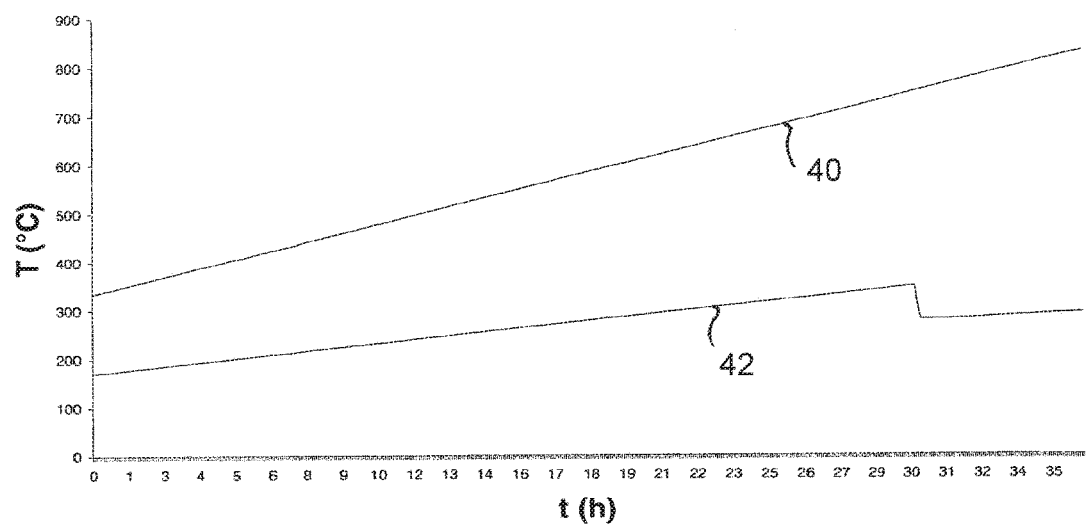
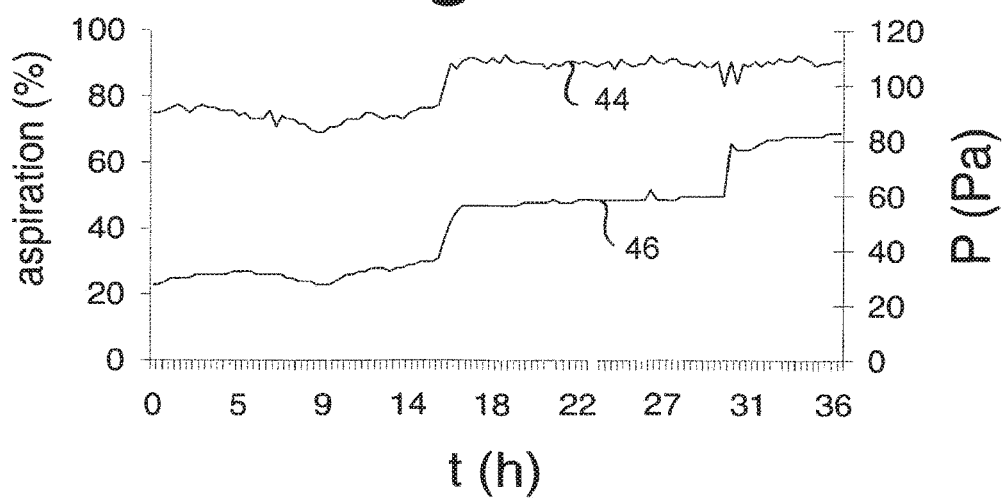

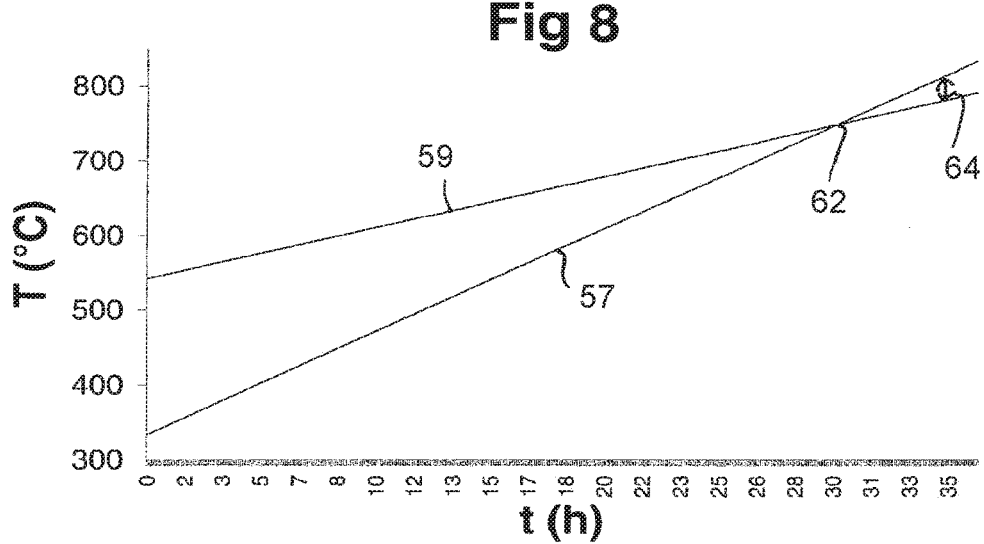
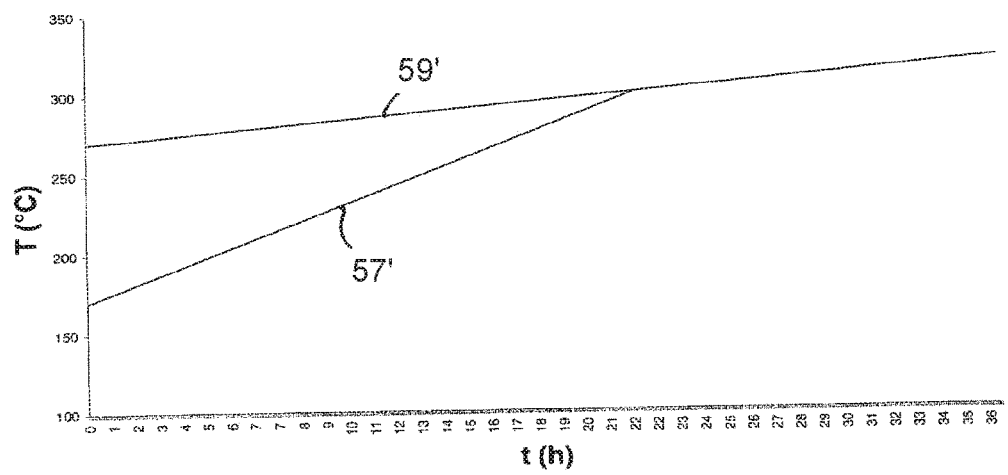

CONTROL PROCESS FOR AN ANODE BAKING FURNACE AND ADAPTED FURNACE USING SUCH PROCESS

CROSS-REFERENCE TO RELATED APPLICATIONS

The present application is a U.S. National Phase filing of International Application No. PCT/FR2010/000413 filed on Jun. 7, 2010, designating the U.S. and claiming priority to France Patent Application No. 0902895 filed on Jun. 15, 2009. The present application claims priority to and the benefit of both of the above-identified applications, and both of the above-identified applications are incorporated by reference herein in their entireties.

The present invention relates to a control process for a furnace known as a "ring furnace" for baking carbonaceous blocks, particularly carbon anodes used for the production of aluminum by electrolysis.

Control process for this type of furnace are already known, as in patent documents FR 2 600 152, FR 2 614 093, EP1070224 and WO 91/19147.

This type of furnace, also known as an "open chamber furnace", includes, as described in the above-mentioned documents, in the longitudinal direction, a plurality of chambers for natural pre-heating, baking, blowing, forced cooling and unloading, and inactive chambers, each chamber being made up, in the transverse direction, by the alternate juxtaposition of hollow heating partitions in which the gases circulate, and of cells in which the carbonaceous blocks to be baked are piled up, the blocks being covered in a carbonaceous dust called "coal dust". The hot gases or flue gases that carry out baking flow through the hollow, thin-walled partitions extending in the longitudinal direction of the furnace. The upper parts of the hollow partitions are provided with sealable openings known as "peepholes". They may additionally comprise baffles or tie bricks to extend the path of the gas flow or flue gases and distribute them more uniformly. The upper parts of the cells are open to allow the raw blocks to be loaded by stacking and to unload cooled, baked blocks.

This type of furnace generally comprises two longitudinal bays the overall length of which may be in excess of one hundred meters and comprising a succession of chambers separated by transverse walls. The two bays are made to communicate at their longitudinal ends by flues which make it possible to transfer gases from one bay to the other.

The furnace is heated by heating ramps of a length equal to the width of the chambers and comprising one or more burners, or one or more injectors per hollow partition. The injectors or burners are introduced via the peepholes into the hollow partitions of the chambers concerned. Upstream of the burners or injectors (in relation to the direction of movement of the rotating fire also corresponding to the direction of gas circulation in the hollow partitions), there are combustion-air blowing legs fitted to an upstream blowing ramp provided with fans, these blowing legs being connected, via the peepholes, to said partitions. Downstream of the burners or injectors there are combustion smoke suction legs, fitted to a downstream suction ramp supplying smoke collection and treatment centers and equipped with shutters to control the suction rate of the suction legs at the desired levels. Heating is provided both by primary fuel combustion injected into the baking chambers, and by secondary fuel combustion made up of combustible volatile matter (such as for example polycyclic aromatic hydrocarbons) emitted by the blocks. This combustible volatile matter is more particularly emitted by coal-tar pitch from the blocks, as the blocks increase in temperature in the natural pre-heating chambers. As the partitions are under negative pressure in the natural pre-heating chambers, the combustible volatile matter leaves the cells, passing through the hollow partition via openings made for this purpose and are burnt with the oxygen remaining in the flue gases which are circulating in the hollow partitions of these chambers.

Typically, around ten chambers are "active" simultaneously: four in a blowing zone, three in a heating zone, and three in a natural pre-heating zone.

As baking takes place, for example in 28-hour cycles, the upstream "blowing ramp/heating ramp/downstream suction ramp" assembly is made to move forward (rotate) by one chamber, each chamber in this way fulfilling different functions in succession:

- downstream of the natural pre-heating zone ("inactive" chamber or loading chamber), a loading function for the raw carbonaceous blocks,
- in the natural pre-heating zone, a function for natural pre-heating of the partitions, carbonaceous blocks, etc., by the flue gases circulating in the partitions and secondary fuel combustion,
- in the baking zone, a function for heating the carbonaceous blocks to 1100-1200° C., and finally,
- in the blowing zone, a function for cooling the carbonaceous blocks by means of cold outside air blown into the hollow partitions and, as a corollary, pre-heating this air circulating in the hollow partitions that makes up the combustive fuel of the furnace by the heat given out by the carbonaceous partitions, blocks etc,
- the blowing zone being followed, downstream, by a zone for forced cooling and unloading of the cooled carbonaceous blocks.

The usual method for regulating this type of furnace is to control the temperature and/or the pressure of a certain number of the furnace chambers. Typically, out of 10 simultaneously active chambers, 4 have temperature measurements and 2 have pressure measurements. Firstly, the three heating zone chambers each have a heating ramp and are controlled according to the temperature of the flue gases, fuel injection being typically adjusted so that the flue gas temperature follows a curve of temperature rise over time. In addition, the fan speed of the blowing ramp is typically adjusted according to pressure measured upstream of the burners. Finally, the shutter opening of the suction ramp may be controlled by negative pressure measured in a chamber located between the heating ramps and the suction ramp. But, generally, especially in the most recent furnaces, said negative pressure is itself controlled by a temperature set point, typically the temperature of the flue gases at a point in the natural pre-heating zone, so that said shutters are controlled by a temperature measurement and its comparison with a set point changing over time.

The result generally expected from a control process is to make the carbonaceous blocks follow a rise in temperature by respecting the various phases of baking and by preventing unburnt residues from giving rise to smoke from the unburnt residues and from deposits. The rise in temperature of the anodes generally includes a substantially linear rise in temperature to approximately 1100-1200° C., corresponding to the final baking temperature of the carbonaceous blocks and depending mainly on the nature of the raw materials that they are made of. To obtain this desired rise in anode temperature a temperature curve of the gases in the partitions is determined, which also takes account of the contribution of calories due to the burning of combustible volatile matter.

As is known from, for example, patent application FR 2 600 152 which discloses a conventional control process, the temperature required in the baking zone is obtained by controlling the injection of primary fuel in the baking zone using the measurements of the temperature in the partitions. The temperature of the gases in the natural pre-heating zone is controlled by adjusting suction through the suction legs and blowing through the blowing legs, or the air flow rates in the various partitions. In fact, the temperature is measured and the flow modified according to the assigned temperature law. The natural pre-heating zone is then heated by having all the gases or flue gases circulate in the partitions as hermetically as possible.

In this patent application FR 2 600 152, this air flow may moreover be controlled automatically so as to depend on a measurement of smoke opacity in the suction nozzles, as well as on the temperature in the partitions of the natural pre-heating zone. The air flow circulating in the partitions is logically increased in the zones where the primary and secondary fuels are burnt to decrease the smoke from unburnt residues.

In patent application FR 2 614 093, this air flow, or amount of air necessary and sufficient to obtain complete combustion of both the combustible volatile matter released during baking of the carbonaceous blocks and of the primary fuel injected, is calculated on the basis of the amount of primary fuel injected and the amount of volatile combustible matter contained in the carbonaceous blocks and released according to the temperature.

In patent application WO 91/19147, this air flow is controlled and minimized by controlling the ratio of oxygen to fuel in the furnace by measuring the oxygen content in the partitions and, if necessary, injecting air into the partitions immediately downstream of the baking zone so that the oxygen content is sufficient to allow combustion of all the combustible volatile matter. Adding cold air directly after the baking zone for the combustion of combustible volatile matter has the drawback of cooling the gases and of making self-ignition of the volatile combustible matter released by the carbonaceous blocks a haphazard affair.

Patent EP 1 070 224 discloses a control system used to optimize combustion and heat transfer while mitigating abrupt variations in parameters by monitoring a set-point based on enthalpic flows.

A recurring problem in the field of ring furnaces is therefore the formation of smoke from unburnt residues in the partitions. As this smoke from unburnt residues is formed mainly when the amount of oxygen, in the direct vicinity of the primary fuel injected or the secondary fuel released by the carbonaceous blocks, is insufficient to cause complete combustion of both the primary fuel and the secondary fuel, a multitude of control processes can be found in prior art for determining the amount of air to be introduced into the partitions. These control processes are mainly based on temperature measurements and pressure measurements, in a large number of chambers, and in the various partitions of the same chamber. Complimentary measurements, as indicated in the state of the art quoted, may be used in addition to these basic measurements.

It is also a constant feature that the gas flow circulating in the partitions must regardless be kept at a minimum level so as to keep infiltrations of air resulting from the negative pressure, mainly in the natural pre-heating zone, to a minimum.

Of these two antagonistic requirements, a sufficient air input for complete combustion of the primary and secondary fuels takes precedence in practice for safety reasons It is particularly important that, in the natural pre-heating zone, the secondary fuel is sucked towards the hollow partitions and burns immediately in the presence of residual oxygen present in the flue gases. If not, smoke from unburnt residues or pitch vapors may settle and clog the suction legs, the downstream suction ramp and the flues which lead to the smoke treatment and collection center. These deposits may then ignite in contact with incandescent particles of coal dust transported by circulating gases. These fires damage the piping and the smoke manifolds. In view of these risks, safety margins are applied by increasing the flows of the flue gases sucked out accordingly to limit the smoke from unburnt residues.

But an increase in flow in the partitions generates a complete modification of the heat transfer balance within the partitions. The input of preheated air to the baking zone and coming from the blowing zone is increased so that it is necessary to burn more primary fuel to reach the anode baking temperature. The input of hot air to the natural pre-heating zone and coming from the baking zone is increased so that the rise in temperature in the natural pre-heating zone is accelerated and may depart from the preset temperature rise law to be followed. Now, the rise in temperature in the natural pre-heating zone determines the place in the natural pre-heating zone partitions where combustion of the secondary fuel occurs and the location of the secondary fuel combustion front, usually called the degassing front. The secondary fuel is released by the carbonaceous blocks depending on the temperature of the carbonaceous blocks. Degassing front is taken to mean the downstream limit of the combustion of the combustible volatile matter. In known control processes, this degassing front is perpetually moving in the direction of the advancing fire. The location of the degassing front is a very important parameter for controlling ring furnaces for carbon anodes. This degassing front must be kept at a reasonable distance from the suction legs so as to limit the risks of damage to the equipment and fire hazards in the suction legs, the downstream suction ramp, the flues and the gas collection and treatment center caused by the flames inherent in the combustion of secondary fuels or by incandescent particles of coal dust ignited by these flames and entrained by the circulation of gases. "Reasonable distance" is taken to mean, for example, that the distance between the degassing front and the suction legs is sufficient for the incandescent particles of coal dust ignited around the degassing front to be extinguished. For example, for a furnace comprising ten chambers, three of which are fulfilling the natural pre-heating function, the degassing front must not move forward downstream of the middle of the first chamber (on which the downstream suction ramp is installed). The location of the degassing front is an important safety criterion in furnace control.

In furnaces of prior art, an increase in the gas flow circulating in the partitions causes the degassing front to move forward towards the suction ramp, which may be detrimental to the safety of the furnace and the staff operating it.

On many furnaces, it is impossible, with usual operating cycles, to sufficiently increase the gas flow so as to eliminate smoke from unburnt residues while keeping the degassing front in a suitable position. This is particularly the case with furnaces that are fairly sensitive to the formation of smoke from unburnt residues such as certain old or damaged furnaces. It is also the case for furnaces with a small pressure loss, like furnaces "without baffles" or with tie bricks, such as disclosed by patent EP1093560, for which the gas path is shorter and pressure losses low along the gas path so that even a small increase in gas flow causes the degassing front to move forward very significantly.

So while known control systems may be suitable for baking with the usual operating cycles for which the furnaces were designed, i.e. heating system rotation cycles of between 24 hours and 32 hours and, for example, baking over ten chambers, it is impossible to use these for bakes with long cycles, of 33 hours or more, since, because of the large amount of time devoted to the rise in temperature in the natural pre-heating chambers and the large gas flow necessary for proper combustion of primary and secondary fuels without forming smoke from unburnt residues, the temperature of the anodes and the gas rises too highly in the chamber near the downstream suction ramp and the degassing front approaches the downstream suction ramp too closely.

As the modification of cycle time is dictated by economic reasons to ensure that the production of carbonaceous blocks keeps up with demand, there is a great need for a control process allowing a large amount of flexibility in terms of the usable cycle times.

Ultimately, running and control of furnaces today are characterized by the adoption of a large safety margin concerning the location of the degassing front within the natural pre-heating zone, which has a direct impact on one of the main parameters of furnace control, namely the flow of gas circulating in the hollow partitions generated by the blast of air upstream of the blowing chambers and the extraction of combustion smoke downstream of the natural pre-heating chambers. Confrontation during operation between the safety margin designed to limit the smoke from unburnt residues and the safety margin on the location of the degassing front means that the application of current control processes is restricted to certain optimum cases in terms of cycle times and/or ideal furnaces.

The safety margin adopted to control the gas flow in relation to the location of the degassing front may sometimes also lead to too slow a rise in gas temperature, especially in the chamber directly upstream of the suction ramp, and to a cold degassing phenomenon, which means that combustible, volatile matter released by the anodes which have reached a salting-out temperature does not ignite when it enters the hollow partitions because the temperature of the gas circulating in the partitions opposite these anodes is not sufficiently high to cause ignition of this combustible volatile matter. This unburnt combustible volatile matter then condenses in the hollow partitions and cause deposits that are detrimental to furnace performance.

Controlling the location of the degassing front is a constant problem in the field of ring furnaces, since this degassing front cannot, using known control processes, be positioned reliably and accurately but must be kept far enough away from the suction ramp for safety reasons without being so far as to prevent cold degassing.

The present invention aims to solve these problems by proposing an improved control process making it possible to widen the range of use of ring furnaces. The present invention additionally aims to propose another simple and reliable control process to reduce the problems of combustion.

DESCRIPTION OF THE INVENTION

For this purpose, the invention relates to a control process for a furnace for baking carbon anodes for the production of aluminum by electrolysis, the furnace including:

longitudinal hollow partitions in each of which a hot baking gas flow may circulate at a certain flow rate and at a certain temperature, the hollow partitions defining together in-between cells to receive the anodes to be baked and including a plurality of peepholes, and a heating system, rotating in relation to the hollow partitions, which comprises an upstream ramp of several blowing legs blowing air into the various hollow partitions, a downstream ramp of several suction legs sucking gas from the various hollow partitions and, between said upstream and downstream ramps, at least one heating ramp equipped with at least one burner or at least one fuel injector per partition;

lines for gas flows to circulate in the hollow partitions being formed in the hollow partitions between the blowing legs and the corresponding suction legs;

the process including a natural pre-heating phase for the partitions and anodes during which the anodes release combustible volatile matter which burns inside the hollow partitions forming a degassing front to pre-heat the gases, the partitions and the anodes, this natural pre-heating phase being carried out in a natural pre-heating zone of the furnace downstream of the heating ramp, characterized in that the natural pre-heating zone is divided into at least one first natural pre-heating zone located at a first distance from the heating ramp and a second natural pre-heating zone located at a second distance from the heating ramp, the first distance being larger than the second distance, and in which gas flows circulating in the hollow partitions are modified so as to control gas flows passing through the first natural pre-heating zone from gas flows leaving the second natural pre-heating zone to regulate the rise in temperature of the partitions and the anodes in the first natural pre-heating zone and control the location of the degassing front.

This flow modification occurs between the first natural pre-heating zone and the second natural pre-heating zone, in particular by adding a flow coming from outside the partitions to the flow leaving the second pre-heating zone, by adding a coolant into the flow leaving the second natural pre-heating zone or by diverting part of the flow leaving the second natural pre-heating zone towards the outside of the partitions.

The first natural pre-heating zone therefore preferably includes its own control system making it possible to control the gas temperature and the flow of gas circulating in the first natural pre-heating zone, whatever the temperature of the gases and the flow rate of gases leaving the second natural pre-heating zone. In this way, control of the gas temperature and the flow of gas passing through said first natural pre-heating zone is dissociated from control of the gas temperature and the flow of the gas leaving the second natural pre-heating zone. The gases leaving the second pre-heating zone may, however, advantageously be used to provide the thermal energy necessary to raise the temperature of the anodes in the first natural pre-heating zone provided for by the control system.

The temperature rise of the anodes and the location of the degassing front in the first natural pre-heating zone are consequently no longer related to the thermal energy carried by gases in the zone upstream or second natural pre-heating zone as was the case with the control processes of prior art, where the entire gas flow leaving the second natural pre-heating zone was transferred directly and as hermetically as possible to the first natural pre-heating zone. The thermal energy of the gases may be defined, in the natural pre-heating zone of the furnace placed downstream of the degassing front, by the gas flow rate and the temperature of the gases. According to the invention, the thermal energy transported by the gases leaving the second heating zone may be used only partially to control the rise in temperature of the partitions and carbonaceous blocks in the first natural pre-heating zone. Only the desired amount of thermal energy is used.

According to the invention, the heat transfers taking place in this first natural pre-heating zone can therefore be controlled independently of the heat transfers taking place in the second natural pre-heating zone and also in the rest of the furnace. This makes it possible to influence the rise in temperature of the anodes in the first zone and so control it. Controlling this temperature rise of the anodes in this first natural pre-heating zone makes it possible to control the release of the combustible volatile matter and therefore the location of the degassing front in the natural pre-heating zone, especially at the end of the baking cycle.

The gas flow circulating in the hollow partitions therefore no longer needs to be limited by requirements concerning the location of the degassing front.

The gas flow circulating in the blowing zone, the baking zone and the second pre-heating zone is therefore nothing but one secondary parameter among others influencing heat transfer and temperature rise of the anodes in the first natural pre-heating zone, which makes it possible to control the location of the degassing front so that it is possible to regulate and control the location of the degassing front whatever the flow and temperature of gases circulating in the blowing zone, the baking zone and the second pre-heating zone. This flow rate may consequently be controlled and increased sufficiently to reduce or prevent combustion problems, especially to encourage combustion of volatile combustible matter.

Also, as the location of the degassing front may be accurately controlled independently of the gas flow rate circulating in the blowing zone, the baking zone and the second pre-heating zone, there is no longer any limit to using furnaces in inadequate conditions, or conditions that the control processes of prior art did not permit.

Implementation of the process according to the invention is therefore particularly advantageous in a furnace with partitions without baffles, inside which pressure losses are generally small.

Implementation of the process according to the invention is also particularly advantageous when it is desired to operate a furnace with long cycles of more than 33 hours.

Implementation of the process according to the invention is also particularly advantageous for large furnaces comprising a great number of heating ramps, for example 4 or more, and which therefore require a large amount of oxygen for good combustion.

Implementation of the process according to the invention is also particularly advantageous when there is a particularly large amount of pitch in the furnace, requiring a large amount of oxygen for the volatile combustible matter to burn properly, for example when the anodes have a high pitch content, when there is a large number of anodes in the cells or when the anodes are large.

The process according to the invention allows total freedom concerning the control of gas flow circulating in zones of the furnace other than the first natural pre-heating zone, inside which combustion of the primary and secondary fuels takes place. It is therefore possible to control this flow rate in the way indicated in the known processes presented above, for example by calculating the combustion of all the primary and secondary fuels or by detecting the smoke from unburnt residues.

It is also possible to increase this flow rate still further, beyond the values previously necessary. This flow rate then makes it possible advantageously to drain the combustible volatile matter from the cells towards the hollow partitions under a high negative pressure for it to be completely burnt. It is consequently advantageous to increase the flow rate by a few percentage points beyond what is necessary to prevent problems of combustion in order to avoid the problems of prior art caused by poor drainage of the combustible volatile matter; i.e. undrained pitch vapors remaining in the coal dust and causing undesirable sticking together of anodes, coal dust and anodes or coal dust and partitions, or forming pitch chrysene deposits on the surface of the cells.

In addition, as it is no longer necessary to preserve a safety margin to control the gas flow rate in relation to the location of the degassing front, the gas flow rate may be increased sufficiently for the gases to be permanently hot enough opposite the anodes at the level of the degassing front to prevent cold degassing of the anodes.

The increase in the gas flow rate circulating in the hollow partitions consequently optimizes the energy in the furnaces owing to the fact that:
  all the combustible, volatile matter is drained off to the hollow partitions;
  all the combustible, volatile matter burns in the partitions because the temperature of gases in the partitions is high enough to ignite this combustible, volatile matter; and
  the primary and secondary fuels burn completely.

The result of such an assessment contradicts the generally accepted ideas which state that the energy efficiency of a furnace is decreased by increasing the air flow rate because of the increase in infiltrations of cold air in the hollow partitions.

According to the invention, the flow rate and the temperature of the gases going through said first natural pre-heating zone may be dissociated from the flow rate and the temperature of gas leaving the second natural pre-heating zone throughout the cycle or during only part of the cycle.

When this dissociation takes place during only a part of the cycle, the furnace is controlled during the other part of the cycle using a conventional control strategy of known type during which the gases leaving the second natural pre-heating zone enter the first natural pre-heating zone without any particular modification of flow rate or temperature.

According to another aspect of the invention, this dissociation may also be used to provide room for maneuver in order to maintain the high rate of gas circulation in the furnace while keeping the degassing front at a reasonable distance from the downstream suction ramp, without being implemented systematically at each cycle and for each partition. In other words, the process according to the invention takes over from a conventional process of the known type should unwanted changes occur.

According to a first mode of implementation of the process according to the invention, the gases leaving the second natural pre-heating zone are cooled before they pass through the first natural pre-heating zone. These cooled gases then transmit less thermal energy to the partitions and the anodes than they would have done if they had all been transferred directly and hermetically as in the known processes. Cooling of the gases leaving the second natural pre-heating zone is then controlled before they pass through the first natural pre-heating zone so as to control the rise in temperature of the anodes and the location of the degassing front.

This cooling may advantageously be implemented by introducing into the partitions outside air coming from outside the partitions between the first and the second natural pre-heating zones. This outside air, substantially colder than gases leaving the second natural pre-heating zone, mixes with the gases leaving the second natural pre-heating zone to cool them before they pass through the first natural pre-heating zone. The gases passing through the first natural pre-heating zone are at a lower temperature than the gases leaving the second natural pre-heating zone. The amount of outside air introduced and the temperature of this outside air make it possible to control the temperature rise of the anodes and the location of the degassing front.

This outside air is advantageously introduced by opening peepholes placed between the first and second natural pre-heating zones to cool gases leaving the second natural pre-heating zone by taking in outside air. The outside air is sucked into the partitions because of the negative pressure in the partitions of the natural pre-heating zone and passes through the first natural pre-heating zone with the gases leaving the second natural pre-heating zone because of suction by the downstream suction ramp placed downstream of the first natural pre-heating zone.

Advantageously, the gas flow rate sucked in by the suction legs is increased to maintain the flow rate of gas leaving the second pre-heating zone during introduction of outside air or when the peepholes are opened.

In this way, the flow rate and the temperature of gas passing through said first natural pre-heating zone are regulated so as to control the location of the degassing front without affecting the flow and the temperature of gas passing through the second natural pre-heating zone. Such a control process according to the invention can be implemented on existing furnaces without requiring any modifications. It involves a new approach to regulation of ring furnaces but may be implemented jointly with a conventional regulation process from prior art. Opening peepholes does not interfere with the control or safety parameters of the furnace.

The process according to the invention goes against all instructions in the field of ring furnaces, for which it is recommended to keep the partitions and cells as leaktight as possible throughout the anode baking operation so as to keep infiltrations of outside air into the partitions down to a minimum. According to the invention, the place where it is desired to bring this outside air into the partitions is determined and the amount of outside air introduced into the partitions is regulated so as to control the temperature and the gas flow rate circulating in the partitions downstream of the external air intake, independently of the temperature and the gas flow rate circulating in the partitions upstream of this air intake. This makes it possible to control the temperature rise of the anodes and therefore the position of the degassing front.

The peepholes can be opened manually by the furnace operating staff or automatically, by means, for example, of valve systems placed beforehand on the peepholes located between the first natural pre-heating zone and the second natural pre-heating zone and which can be actuated to open the peepholes.

According to the invention, the peepholes may be completely or partially opened, i.e. open to a certain percentage so as to control the amount of air entering the partitions; this opening percentage of the peepholes may additionally vary in time.

The process according to the invention advantageously includes stages involving, for each line for the circulation of gas flows in the hollow partitions, measuring the temperature at least one given point in the natural pre-heating zone; comparing the temperature measured with a corresponding reference; and ordering an action to cool gases leaving the second natural pre-heating zone before passing through the first natural pre-heating zone according to the result of this comparison, for example opening the peepholes to a percentage of opening which depends on the result of the comparison. The temperature is more particularly measured in the first pre-heating zone and/or the second pre-heating zone and then compared with a reference consisting of a law expressing the temperature as a function of time.

Ordering an action for cooling the gases which leave the second natural pre-heating zone before passing through the first pre-heating zone may, in addition, advantageously be given according to time, in particular over a certain period of each cycle. The peepholes may for example be half open for a period specified at the beginning or the end of each cycle.

Advantageously, the process according to the invention also includes a stage consisting of installing on the furnace peepholes a plurality of flexible sleeves provided with a system of valves to open and close the peepholes. Other automated devices designed to partially or completely open the peepholes may also be considered within the framework of this invention.

The flow rate of gases circulating in the partitions may be regulated so that all the fuels provided by at least one burner or at least one fuel injector and by the combustible volatile matter can be burned.

The flow rate of gases circulating in the partitions may further be regulated as follows: for each gas circulation line, the amount of smoke in the partitions is measured, in particular by means of an opacity measurement or a carbon monoxide (CO) content measurement; this measurement is compared with a corresponding reference; and an adjustment of the flow rate of gases circulating is ordered according to the result of this comparison.

In a second mode of implementing the process according to the invention, at least part of the gas leaving the second natural pre-heating zone is deviated away from the hollow partitions. The gases diverted away from the hollow partitions do not pass through the first natural pre-heating zone and are therefore not involved in the temperature rise in the partitions and the carbonaceous blocks in the first natural pre-heating zone. This process according to the invention also goes against the generally accepted ideas in the field which tend to take maximum advantage of the thermal energy transported by the gases to create the temperature rise in the anodes and the hollow partitions.

According to an advantageous embodiment of the invention, the downstream ramp comprises, by partition, a first gas suction leg and a second gas suction leg with a valve system, and the first suction leg is fitted to a peephole placed downstream of the first natural pre-heating zone, and the second suction leg on a peephole placed between the first natural pre-heating zone and the second natural pre-heating zone. The valve system may therefore be controlled so as to regulate the gas flow rate passing through the first natural pre-heating zone.

According to another advantageous embodiment of the invention, the movement of the downstream ramp is delayed in relation to the rest of the rotating heating system. In this last embodiment, the first pre-heating zone corresponds more particularly to the first active chamber of the furnace.

During the first part of the cycle, the downstream suction ramp will not be placed downstream of the first natural pre-heating zone. The air leaving the second natural pre-heating zone during the first part of the cycle will therefore not pass through the first natural pre-heating zone and will not be used for the temperature rise of the partitions and anodes. This embodiment has the additional advantage that the anode temperature rise is carried out quickly because the gases leaving the second natural pre-heating zone after the suction ramp has moved are at a high temperature, in particular in comparison with the gases leaving the second natural pre-heating zone at the beginning of the cycle. This embodiment is not detrimental to the safety of the furnace because the degassing front is fairly far away from the downstream suction ramp at the beginning of cycle.

Movement of the downstream suction ramp is ordered from a reference time predetermined, for example, by calculation or experimentation.

Also, each gas circulation line is individually controlled so as to allow perfect alignment of the degassing fronts between the various lines of gas circulation and to obtain more homogeneous baking.

In the processes of prior art where the principal means of regulating the anode temperature rise in the natural pre-heating zone is the flow rate of blown and sucked air, a dispersion of the flow rates between the various circulation lines may involve a dispersion of the levels of anode temperature rise and baking which means that some of the anodes must be baked excessively in order to ensure a minimum quality for all the anodes, which leads ipso facto to a lowering of the energy efficiency of the furnace. The process according to the invention advantageously provides more accurate regulation of the temperature rise in the first natural pre-heating zone and therefore more homogeneous baking. Also, as the rise in temperature of the anodes and the location of the degassing front no longer depend directly on the blown or sucked flow rate, the flow rates may for example be kept identical for all the gas circulation lines, giving more homogeneous burning in the furnace.

Preferably, the temperature of the anodes is limited to 250° C. in the first natural pre-heating zone so as to avoid cold degassing of the anodes and a too great a move forward of the degassing front.

According to the invention, it is also possible to design a control process in which the first natural pre-heating zone of the furnace includes an autonomous heating system and in which the controlled temperature rise of the anodes in the first natural pre-heating zone is carried out by means of this autonomous heating system. Autonomous heating system is taken to mean that the first natural pre-heating zone is disconnected from the rest of the furnace. This autonomous heating system may for example include burners.

The invention also relates to a furnace for baking anodes for the production of aluminum by electrolysis, comprising:
  longitudinal hollow partitions in each of which a hot baking gas flow may circulate at a certain flow rate and at a certain temperature, the hollow partitions defining together in-between cells to receive the anodes to be baked and including a plurality of peepholes,
  a heating system, rotating in relation to the hollow partitions, which comprises an upstream ramp of several legs blowing air into the various hollow partitions, a downstream ramp of several legs sucking gas from the various hollow partitions and, between said upstream and downstream ramps, at least one heating ramp equipped with at least one burner or at least one fuel injector per partition;
  lines for gas flows to circulate in the hollow partitions being formed in the hollow partitions between blowing legs and corresponding suction legs;
  a natural pre-heating zone of the furnace being defined downstream of the heating ramp on which the anodes release the combustible, volatile matter which burns in the partitions, forming a degassing front to pre-heat the gases, the partitions and the anodes, this natural pre-heating zone being divided into at least one first natural pre-heating zone located at a first distance from the heating ramp, and a second natural pre-heating zone located at a second distance from the heating ramp, the first distance being greater than the second distance, and,
  characterized in that it is adapted for the implementation of the process according to one of the preceding claims, and includes:
    means of temperature measurement in the natural pre-heating zone,
    means of analysis able to compare this temperature with a corresponding reference;
    means of control able to order an action for cooling the gases passing through the first natural pre-heating zone according to the result of the comparison carried out by the means of analysis.

This furnace according to the invention may also comprise means of cooling able to cool the gases leaving the second natural pre-heating zone before they pass through the first natural pre-heating zone. These means of cooling may, for example, be peepholes that can be opened or flexible sleeves inserted in the peepholes and provided with a valve system to adjust the percentage of opening of the peepholes.

DESCRIPTION OF THE FIGURES

Below are described, as nonrestrictive examples, several possible embodiments of the invention, with reference to the appended figures:

FIG. 4 is a detailed schematic side view of a portion of the furnace partitions in an example of a manual implementation of a first embodiment according to the invention.

FIG. 5 is a graph showing how the temperature of gases measured in the first natural pre-heating zone and in the second natural pre-heating zone change over time, in one embodiment according to the invention.

FIG. 6 is a graph showing how the negative pressure measured in the second natural pre-heating zone and the opening of the inlet shutter of the suction leg change over time, in one embodiment according to the invention.

FIG. 7 is a detailed schematic side view of a portion of the furnace partitions in an example of an automatic implementation of a first embodiment according to the invention.

FIG. 8 is a graph showing how the gas temperature in the partitions changes over time in relation to a reference law, when the gas temperature is measured in the second natural pre-heating zone.

FIG. 9 is a graph showing how the gas temperature in the partitions changes over time in relation to a reference law, when the gas temperature is measured in the first natural pre-heating zone or downstream of the latter.

DETAILED DESCRIPTION

Figure 1:
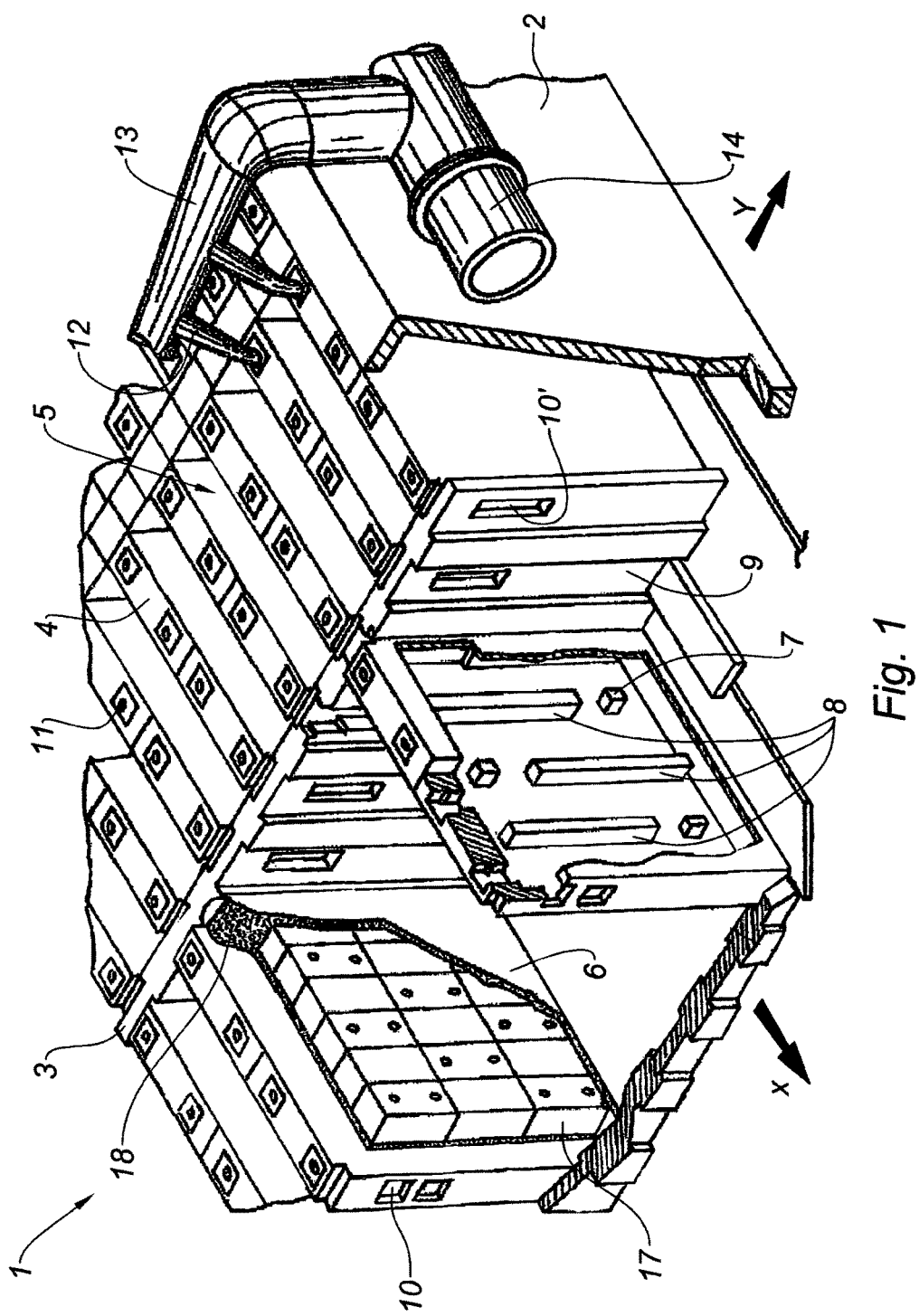
FIG. 1 is a partial perspective view of a typical anode baking furnace in which the process according to the invention may be implemented.
Figure 2:
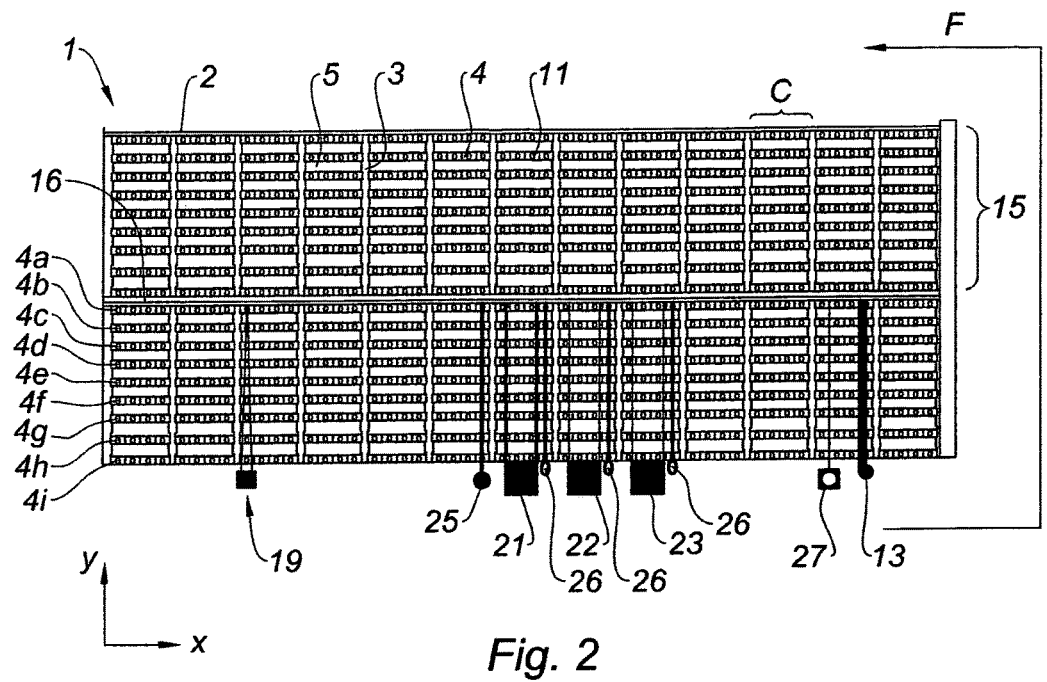
FIG. 2 is a view from above the furnace in FIG. 1.
Figure 3:
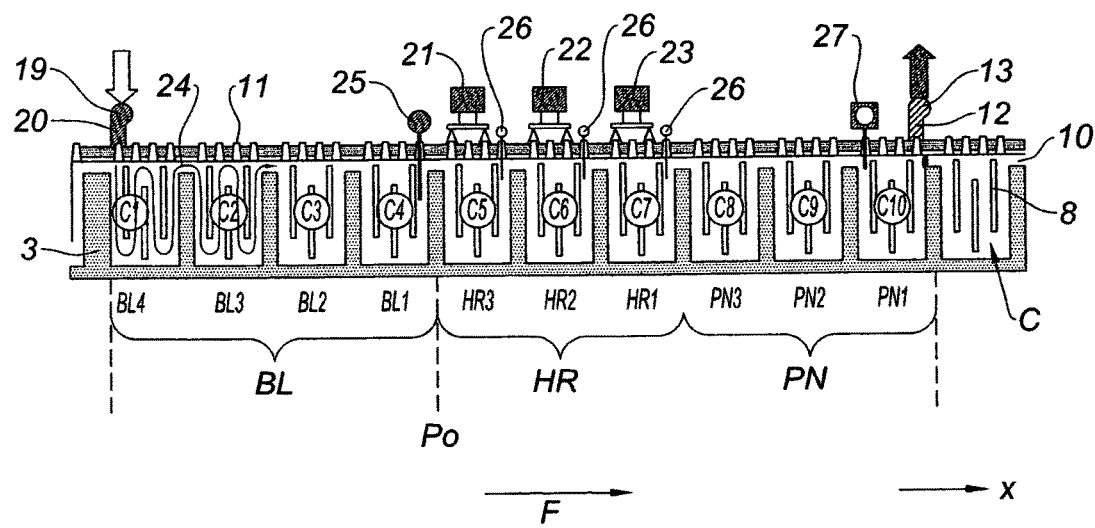
FIG. 3 is a schematic side view of the partitions of the furnace of FIGS. 1 and 2.

The detailed description which follows relates to the application of the invention to facilities including a rotating fire chamber furnace, such as is illustrated in FIGS. 1 to 3. The invention is nevertheless not limited to this type of furnace. In particular, the invention is also applicable to facilities comprising a furnace without intermediate transverse walls.

Furnace 1 includes an insulated enclosure 2 of substantially parallelepipedic form, in relation to which a longitudinal direction X and a transverse direction Y are defined. In enclosure 2 are placed the transverse walls 3 defining successive chambers C along direction X. In each chamber C hollow partitions 4 are provided, placed longitudinally, forming between them extended cells 5. Each chamber C therefore comprises several partitions 4a to 4i, as illustrated in FIG. 2.

Partitions 4 include thin side walls 6, generally separated by tie bricks 7 and baffles 8. The ends of the hollow partitions comprise openings 10 and are embedded in notches 9 of the transverse walls 3. These notches 9 are themselves provided with openings 10' located opposite openings 10 of partitions 4, in order to allow the gases circulating in partitions 4 of one chamber C through to the following chamber. Partitions 4 include, in addition to peepholes 11 or openings which are in particular used to insert means of heating (such as fuel injectors or burners), suction legs 12 of a downstream suction ramp 13 connected to a main conduit 14 that skirts furnace 1, blowing legs, measuring device sensors (such as thermocouples, opacity meters), maintenance appliances etc;

As can be seen particularly in FIG. 2, chambers C form a long bay 15 in the longitudinal direction, and furnace 1 typically includes two parallel bays, each one about a hundred meters long, bounded by a central wall 16. In each bay 15, there are therefore longitudinal lines of partitions 4.

In cells 5 raw carbonaceous blocks 17 are piled up, i.e. anodes to be baked, and cells 5 are then filled with a granular material or powdery (typically containing coke), called "coal dust" 18, which surrounds these blocks 17 and protects them while baking.

The anode baking furnace also includes a heating system, which typically comprises: an upstream blowing ramp 19 with several blowing legs 20 blowing air into the various partitions 4 of a chamber C (by openings 11), two or three heating ramps 21, 22, 23 each made up of one or two fuel burners or injectors per partition, and a downstream suction ramp 13 with several suction legs 12 sucking gas from the various partitions 4 of a chamber C (from openings 11).

As can be seen in FIG. 3, the various components of the heating system are laid out at a distance from each other according to the following typical fixed configuration: air blowing ramp 19 is located at the entrance to a given chamber C1; the first ramp 21 of burners/injectors is placed above the fifth chamber C5 downstream of air blowing ramp 19, the second ramp 22 of burners/injectors is placed above chamber C6 located immediately downstream of the first ramp 21; the third ramp 23 of burners/injectors is placed above chamber C7 located immediately downstream of the second ramp 22; and the suction ramp 13 is located at the outlet of the third chamber C10 downstream of the third ramp 23.

More generally, the relative position of the various elements is always the same (i.e. in the direction of the fire, blowing ramp 19, the ramps of burners/injectors 21, 22, 23 and the suction ramp 13). However, the spacing (in terms of the number of chambers) between elements may vary from one furnace to another. The first ramp 21 of burners/injectors, for example, could be positioned above chamber C4 or C3. In addition, suction ramp 13 could be located at the outlet of the second chamber downstream of the third ramp 23. Also, the number of ramps of burners/injectors may vary, typically from 2 to 4.

During conventional baking operations known from prior art, air is blown by the blowing legs 20. This air, mixed with primary fuel injected by the ramps of burners/injectors 21, 22, 23 and with secondary fuel produced by the baking of the anodes, circulates in the longitudinal lines of partitions 4, from chamber to chamber, following the path, or circulation line, formed by baffles 8 and passing from one partition to another through openings 10, until it is sucked in by suction legs 12. The suction legs have inlet shutters whose percentage of opening allows control of the negative pressure in the furnace partitions. The furnace, and more particularly the partitions and the cells are closed as hermetically as possible to keep infiltrations of cold air or exfiltrations of hot air to a minimum.

Between a blowing leg 20 and a corresponding suction leg 12, there is therefore a globally longitudinal gas circulation line 24 along successive partitions 4. "Globally longitudinal" is taken to mean that the gas circulates, from a blowing leg towards the corresponding suction leg, globally along direction X, while locally making vertical movements, typically as undulations, as illustrated in FIG. 3. As indicated above, gas flow consists of air, gas resulting from the combustion of injected liquid or gaseous primary fuel, and of the volatile matter released by the carbonaceous blocks 17 (secondary fuel). The heat produced by the combustion of primary and secondary fuels is transmitted to the carbonaceous blocks 17 contained in cells 5, which causes them to be baked.

A carbonaceous block baking operation, for a given chamber C, typically includes loading cells 5 of this chamber C with raw carbonaceous blocks 17, heating this chamber C until it reaches the carbonaceous block 17 baking temperature (typically from 1100 to 1200° C.), cooling chamber C down to a temperature at which the baked carbonaceous blocks can be removed, and cooling chamber C down to the chamber temperature.

The principle of rotating fire involves successively carrying out the heating cycle on the furnace chambers by moving the heating system. A given chamber therefore moves successively through phases of natural pre-heating (by hot gases circulating in the partitions), forced heating and blowing. The baking zone is formed by all the chambers located between the blowing ramp and the suction ramp. In FIGS. 2 and the 3 the direction of fire is represented by arrow F.

The conditions prevailing in the various chambers C of furnace 1 at the level of which the heating system is placed at a given moment are now described, referring to FIGS. 2 and 3.

The first four chambers C1 to C4 following blowing ramp 19 are known as blowing zones BL, respectively BL4, BL3, BL2 and BL1. Excess pressure prevails in these. The anodes that are placed there are already baked, and are cooled by blowing, which results in an increase in temperature of the blown air, which will be used for combustion. The six following chambers C5 to C10, as far as suction ramp 13, are low pressure zones. Substantially at the junction between these two blocks of chambers is located "point zero", P0. This is a point at which the pressure in furnace 1 is substantially equal to atmospheric pressure. Point zero is located upstream of the first heating ramp in order to prevent combustion products from being released into the ambient environment by exfiltration.

A pressure tap ramp 25—known as a point zero ramp 25 (PZR)—is typically provided, positioned so as to be fixed in relation to the heating system in order to control the pressure at point zero. In the embodiment shown, the point zero ramp 25 is located at the level of the peepholes 11 of partition 4 located as far downstream as possible of the last chamber C4, BL1 located in the blowing zone. However, this point zero ramp 25 could be placed at another point of the blowing zone BL.

In the low pressure zone, the following are to be found in succession, from upstream to downstream:

a heating zone HR at the level of chambers C5, C6 and C7 located under the three heating ramps 21, 22, 23, including in the first two chambers C5, C6 a forced heating zone, HR3, HR2 respectively, then in the following chamber C7 a forced pre-heating zone HR1 The temperature of the preheated air in the blowing zones BL is high enough to cause ignition and the combustion of fuel;

a natural pre-heating zone PN at the level of chambers C8, C9 and 010, respectively PN3, PN2 and PN1. The hot gases from the heating zone allow the combustible volatile matter released by the carbonaceous blocks while pre-heating in the pre-heating zone to ignite.

Chamber C located just after suction ramp 13 (completely to the right in FIG. 3), called the dead chamber, is a chamber ready to receive raw carbonaceous blocks 17, which, when the heating system is moved in the direction of fire F, will therefore successively undergo: natural pre-heating (PN1, PN2 then PN3), forced pre-heating (HR1), forced heating (HR2 then HR3), followed by blowing (BL1, BL2, BL3 then BL4), before unloading the baked and cooled anodes.

The heating system also includes a temperature measurement device, which typically includes at least one pyrometer or a thermocouple 26 per heating ramp and partition, each placed immediately downstream of each heating ramp 21, 22, 23.

At least one pressure and/or temperature measurement ramp (TPR) 27 is additionally provided, placed between the last heating ramp 23 and the suction ramp 13, i.e. in zone PN. In the embodiment shown in FIGS. 2 and 3, there is a single TPR ramp for measuring both temperature and pressure. This ramp is positioned at the level of the same chamber C10 as suction ramp 13, i.e. in the first natural pre-heating chamber PN1, for example in peephole 11 upstream of this chamber.

According to a possible alternative of the invention, pressure and temperature may be measured in distinct places in the natural pre-heating zone. In this case there is a temperature measurement ramp and a pressure measurement ramp distinct from each other. Preferably, temperature measurement is made at PN1, while pressure measurement may be carried out at any point in zone PN.

Throughout the description, the expression "measurement ramp 27" or "TPR" will be used to indicate temperature and pressure measurement, possibly in distinct places, in zone PN.

The control process according to the invention aims to dissociate the mode of temperature control of the anodes in the first natural pre-heating zone Z1 from the mode of temperature control of the anodes in the rest of furnace 1 so as to control the location of the degassing front and to dissociate the location of this degassing front from the temperature of the gases and the gas flow rate circulating in partitions 4 upstream of this first natural pre-heating zone Z1. The natural pre-heating zone is thus divided into two distinct zones, i.e. a first natural pre-heating zone Z1 and a second natural pre-heating zone Z2 with different temperature control modes. The second natural pre-heating zone Z2 is the part of the natural pre-heating zone PN nearest to the heating zone HR and the first natural pre-heating zone Z1 is downstream of this second natural pre-heating zone Z2.

In a first embodiment according to the invention, outside air is made to enter partitions 4 at a specific point of the furnace, between the first and the second natural pre-heating zones so that it mixes with the gas flow circulating in hollow partitions 4 and cools the gases.

Such an embodiment may advantageously be implemented on an existing furnace 1 such as described above, for example, without requiring any particular structural modification.

The process according to the invention includes for example:

controlling flow rate D of air circulating in partitions 4 without taking account of the impact of this adjustment on the location of the degassing front in furnace 1; this flow rate may for example be determined so that all the primary and secondary fuels can be completely burned or by continuous adjustment based, for example, on measurements from an opacity meter or a carbon monoxide detector; such a flow rate may moreover be increased by several percent to improve, for example, drainage of the combustible volatile matter from the cells towards the hollow partitions and to increase the temperatures of gases in PN1 for better ignition of this combustible volatile matter;

adjustment of the laws of temperature rise of the gases in partitions 4 of the furnace as is known from processes of prior art;

measurement, for each partition 4, of the temperature at the measurement ramp 27 and when this temperature reaches a given reference value, opening a peephole 11' placed downstream of the measurement ramp, and especially peephole 11' placed directly downstream of the measurement ramp, until the end of the cycle in progress.

When peephole 11' is opened, a flow 30 of outside air, colder than the gases in flow 31 of gases circulating in the partition, spontaneously enters partition 4 owing to the fact that the partition is at negative pressure in the natural pre-heating zone PN. Flow 30 of outside air then mixes with flow 31 of circulating gases and cools these gases so that the gases in the flow made up by the addition of flows 30 and 31 and circulating in the partition downstream of the open peephole 11' are at a lower temperature than the gases in flow 31 upstream of the open peephole 11'.

The temperature rise of the anodes is then slowed down, or even stopped between the time of opening the peephole and the end of the cycle. Opening peephole 11' therefore makes it possible to control the temperature rise of the anodes placed downstream of the peephole and therefore to control the location of the degassing front in furnace 1, independently of the temperature and the gas flow rate circulating in the partitions upstream of the open peephole 11'.

Opening peephole 11' advantageously does not interfere with the other settings of the furnace since measurement ramp 27 is, placed upstream of the open peephole 11'. Measurement ramp 27 does not therefore detect the fall in temperature of the gases circulating in the partitions downstream of open peephole 11'. Also, measurement ramp 27 detects the variation in negative pressure due to opening peephole 11' so that the furnace regulator orders the inlet shutter of suction leg 12 to open more fully to compensate for the amount of outside air being introduced into the partition by the open peephole 11' and to maintain a constant level of negative pressure in furnace 1 upstream of the open peephole and therefore a constant gas flow rate upstream of the open peephole 11'.

In addition, opening this peephole 11' does not involve any modifications to the furnace safety devices.

Determining the temperature rise laws of gases in furnace partitions is a task carried out routinely by experts in the field of ring furnaces. This expert in the field may additionally take account of the impact of opening peepholes 11' when determining this.

Such an embodiment was implemented for a few months on a baffle furnace 1 with 52 chambers, 10 partitions, 9 cells, 21 anodes per cell, and operating with a gas heating system. The heating system of this furnace 1 corresponds to the heating system shown in FIG. 3, with 10 active chambers and 3 heating ramps 21, 22, 23.

The inventors chose to make this furnace 1 operate with particularly long cycles of 36 hours so as to limit the quantity of anodes produced by the furnace and to reduce the amount of gas consumed in manufacturing the anodes.

As it is very difficult and not optimal to use such long cycles with conventional processes of prior art—because it is not possible both to obtain complete combustion of the primary and secondary fuels and to keep the degassing front sufficiently far away from the suction ramp for safety reasons—the inventors advantageously implemented the new process according to the invention.

The inventors sought to obtain a degassing front at the end of the cycle fairly close to suction ramp 13, i.e. so that it is about to pass through the partition-wall between the chamber in PN1 and the chamber in PN2 at the end of the cycle. This location quite close to the suction ramp is desirable because it keeps the risks of cold degassing to a minimum. This is possible because the location of this degassing front can be accurately controlled; it no longer depends on the many unpredictable furnace operating factors which previously made it necessary to keep a large safety margin.

To do this, the peepholes 11' directly downstream of the measurement ramp are fully opened, as can be seen in FIG. 4, when the temperature of the gases measured by measurement ramp 27 reach 750° C. The first natural pre-heating zone Z1 then corresponds to the zone between peepholes 11' and the downstream suction ramp 13 while the second natural pre-heating zone Z2 corresponds to the natural pre-heating zone upstream of peepholes 11'. After opening, peepholes 11' remain open until the end of the cycle. This operation is therefore very simple and may be carried out manually by the operating staff.

The operating staff checks the temperature measured at measurement ramp 27 for each partition on a control screen 32 and when this temperature reaches the reference value of 750° C., they manually open peephole 11' of the corresponding hollow partition. This is done for all partitions 4. In order to be implemented, the process according to the invention does not then require any additional equipment as compared with the existing equipment on conventional furnaces.

Advantageously, in the end partitions in which the amount of secondary fuel released is half that of the other partitions surrounded by two cells, this reference value for the opening of peepholes is increased to 850° C.

After opening, as can be seen in FIG. 4, a flow 30 of outside air is introduced into hollow partition 4, both to be added to, and to be mixed with, flow 31 of gas from the second natural pre-heating zone Z2 to circulate in the first natural pre-heating zone Z1.

FIG. 5, shows together a curve 40 representing the change over time (t in hours) of temperature (T in ° C.) of gases measured at measurement ramp 27, and a curve 42 representing the change over time of the temperature of gases measured inside downstream suction ramp 13 during a cycle. The temperature of the gases at the level of measurement ramp 27, and consequently in the second natural pre-heating zone Z2, continues to rise regularly throughout the cycle while the temperature of gases at the level of the downstream suction ramp 13, and consequently in the first natural pre-heating zone Z1, suddenly decreases when the temperature measured at the measurement ramp reaches the reference value of 750° C., i.e. when peephole 11' is open. The first natural pre-heating zone Z1 has its own temperature rise mode including a break in the regularity of the temperature rise when peephole 11' is opened.

In addition, FIG. 6 shows a curve 44 representing the measurement of negative pressure (pressure P in Pa) over in time at measurement ramp 27, together with a curve 46 representing the percentage of opening (%) over time of the inlet shutter of suction leg 12. It should be noticed that when peephole 11' is opened (at approximately 30 hours), the negative pressure remains stable and continuous at the level of measurement ramp 27 as is aimed at by the control system so that the flow rate of the flow of gas 31 through the second natural pre-heating zone, and therefore leaving the second natural pre-heating zone Z2, remains globally stable and continuous. On the other hand, the flow rate of the flow of the gas passing through the first natural pre-heating zone Z1 greatly increases after opening peephole 11', as shown by curve 46. This is explained by the addition of the flow rate of the flow of gas 31 leaving the second natural pre-heating zone Z2 and of the flow rate of the flow of outside air 30 entering via the open peephole 11'.

In this way, control of the flow rate of the gas flow and the temperature of gases passing through said first natural pre-heating zone Z1 is dissociated from control of the flow rate of the gas flow and the temperature of the gases leaving the second natural pre-heating zone Z2. The temperature rise of the partitions and the carbonaceous blocks in the first natural pre-heating zone Z1 is controlled by regulating the external air intake. In the above example, this external air intake is controlled by varying the time when peephole 11' is opened.

When the temperature rise of the gases circulating in a partition 4 is late in relation to the temperature rise of gases in other partitions 4, peephole 11' of this partition is opened late in relation to the other peepholes 11' so that the temperature rise of this partition in the first natural pre-heating zone Z1 makes up for its delayed temperature rise in relation to the other partitions so that the degassing fronts align systematically. This alignment of the degassing fronts increases the homogeneity of the temperatures in the furnace and greatly improves the energy efficiency of furnace 1.

When the furnace operates with 36-hour cycles and peepholes 11' opening at the reference temperature of 750° C. at measurement ramp 27, the inventors noted that opening occurs on average 6 hours before the end of the cycle.

Other experiments on the same furnace, with cycles of 28 hours and 26 hours respectively and with peepholes 11' opening at the reference temperature of 750° C. at measurement ramp 27, have shown that opening occurs at 2 hours and 4 hours respectively from the end of the cycle.

The process according to the invention can therefore be applied for any cycle time.

Figure 11:
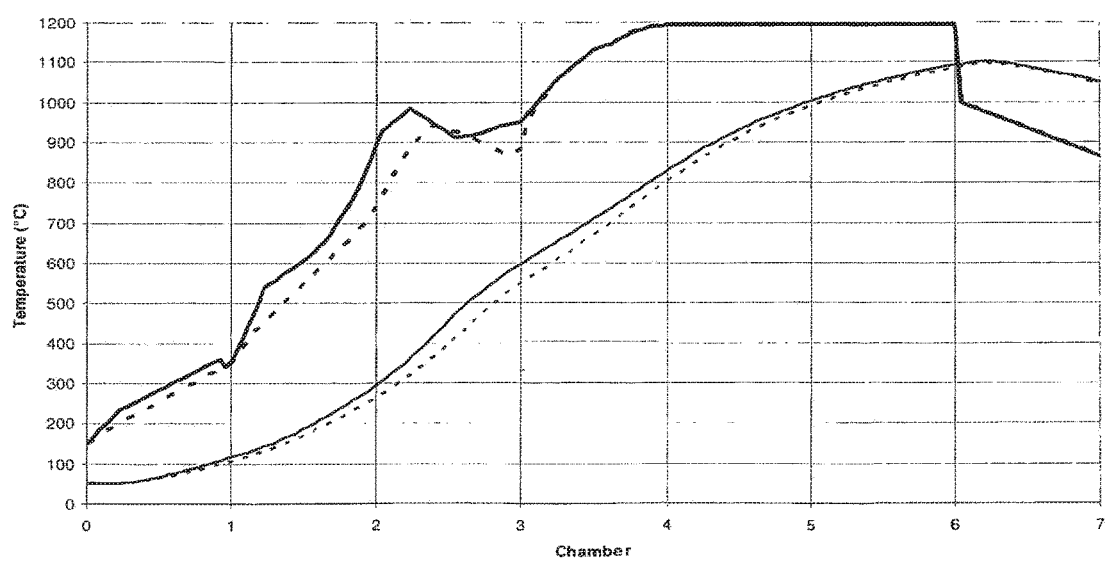
FIG. 11 is a graph showing the overall change in temperature of the gases and anodes in the furnace using the process according to the invention and a conventional process.

FIG. 11 shows a graph used to compare the rise in temperature of gases (top curve) and anodes (bottom curve) globally in the chambers of a furnace for baking anodes using the process according to the invention with opening peepholes (solid lines) and using a conventional process (dotted lines). Chambers 1, 2 and 3 are in natural pre-heating, chambers 4, 5 and 6 are being heated and chamber 7 is cooling. It can be observed that the temperature rise of the anodes in the natural pre-heating zone is quicker with the process according to the invention because of better combustion of the combustible volatile matter in chambers 2 and 3 which significantly increases the temperature of the gases passing through these partitions. Control of the temperature of the gases in the first chamber due to opening the peepholes using the process according to the invention can also be observed.

The anode temperature rise gradient is very steep, generally greater than 5° C./h, more generally greater than 7° C./h and reaching up to 17° C./h. This steep anode temperature rise gradient, encouraged by the process according to the invention owing to the fact that it is possible to control the location of the degassing front and therefore make the furnace operate with a large negative pressure, makes for faster anode baking and therefore increased furnace productivity. It should also be noticed that the anode temperature rise gradient is steeper in the temperature zone in which degassing occurs if it has been possible to keep the anode temperature fairly low, for example about 200-220° C., lower than the degassing temperature of the previous cycle, for example by opening the peepholes. Such a large temperature variation encourages combustion of the combustible volatile matter and prevents cold degassing.

The values indicated above are given as a guide only and may vary according to the furnaces, the desired regulation criteria, the constituents of the anode, etc. as is known in the field the ring furnaces. Also, the peephole to be opened and therefore the location of the limit between the first natural pre-heating zone and the second natural pre-heating zone may depend on the desired regulation criteria, in particular in terms of the location of the degassing front.

Implementing the process according to the invention during these few months made it possible to note:
- the absence of smoke from unburnt residues by means of an opacity meter and by visual observation;
- the absence of deposits of unburnt residues or pitch chrysene;
- a great reduction in coal dust sticking;
- an absence of agglomerate in the coal dust;
- improved combustion making it possible to reach high anode baking temperatures of around 1145° C. (measured with a 1.45 m long thermocouple) while reducing primary fuel consumption;
- a reproducible alignment of the degassing fronts in the various partitions;
- a degassing temperature in the hollow partitions of around 1000° C.

The amount of gas to be managed by the gas collection and treatment center increases slightly, by approximately 10% when operating with 36-hour cycles; the reference temperature for opening peepholes 11' is reached approximately 6 hours before the end of the cycle. This negative effect is largely counterbalanced by the many advantages of the process according to the invention stated above.

The advantages of the control process according to the invention derive from the fact that the level of negative pressure in the furnace and therefore the air flow rate circulating in the partitions can be regulated, without worrying about the location of the degassing front which is controlled independently. The furnace may therefore be made to operate with a high level of negative pressure, and therefore a high flow rate, and consequently improve suction in the partitions of secondary fuel released by the anodes when the anode temperature rises, prevent smoke from unburnt residues, and improve the total combustion by means of a large addition of oxygen and instantaneous ignition by the hot gases.

It is also preferable, as in the processes of prior art, to keep infiltrations and exfiltrations to a minimum by checking that the partitions and cells throughout the furnace are hermetic, for example by covering the partitions and cells with a cover to optimize the energy efficiency of the furnace.

Many alternatives to the process according to the invention may be derived from the example given above.

The time of opening the peephole may, for example, be given from a temperature other than the temperature measured with measurement ramp 27, for example from a temperature taken downstream of peephole 11' such as the temperature of gas entering suction legs 12 or a temperature measured in cells 5 near anodes 17.

Also, the operating staff may advantageously be assisted in determining the time of opening peephole 11'. For this purpose, the process according to the invention may include:
- continuous recording of the temperature measured;
- continuous comparison of the temperature recorded and a reference value;
- having a signal emitted if the comparison between the recorded temperature and the corresponding reference value meets with a preset criterion (for example crossing a threshold). The signal is then for example a visible or audible alarm with a view to triggering manual opening of a peephole 11'.

Opening of peepholes 11' may still be only partial by defining a percentage of opening of the peephole so as to more accurately control the amount of outside air entering the partitions.

It is additionally possible to provide peepholes 11' with valve systems, or the furnace partitions with special air intake systems in conjunction with the existing peepholes, these valve systems or air intake systems, for example, being adapted so as to be handled more easily than simple peepholes 11 or adapted to allow partial opening of peepholes or a controlled air intake.

The first embodiment according to the invention described above may additionally be implemented automatically.

The process according to the invention includes for example:
- regulation of flow rate D of air circulating in partitions 4 without taking account of the impact of this adjustment on the location of the degassing front in the furnace;

adjustment of the laws of temperature rise of the gases in the furnace partitions as is known from processes of prior art;

fitting a flexible sleeve 50 provided with a valve system 52 with automated proportional opening, for example an electrically-operated valve, on the peephole 11' of each partition 4 placed directly downstream of peephole 11 receiving the measurement ramp 27, as is shown in FIG. 7; the flexible sleeves 50 for example are borne by a particular ramp not shown which extends transversely to the partitions;

continuous measurement and recording for each partition of the temperature measured at measurement ramp 27 in a memory 56 of a control unit 54, as shown by curve 57 in FIG. 8;

continuous comparison in a comparator 58 or means of analysis of the control unit 54 of said temperature measured and recorded in relation to a reference value; this reference value varying for example over time so that this reference value then appears as a reference temperature curve as a function of time, as shown by curve 59 in FIG. 8;

triggering or not triggering an action via a decision-making and ordering unit 60 of the control unit according to this comparison; the decision-making and ordering unit starts, for example, this action when, for example, the measured and recorded temperature 57 crosses and passes above the reference temperature curve 59 as a function of time (point 62 in FIG. 8); the action triggered is, for example, automatic opening of the valve system 52; this automatic opening may be partial with a percentage of opening that is a function, for example, of the value of the difference (represented in FIG. 8 by the double arrow 64 for a given time t) between the temperature measured at measurement ramp 27 and the value of temperature reference curve 59; the percentage of opening of the valve system may then vary continuously and automatically.

The peepholes are therefore advantageously opened gradually so that the flow rate sucked by the downstream suction ramp 13, which allows the level of negative pressure in the hollow partitions of the second natural pre-heating zone to remain substantially unchanged, is also increased gradually. The impact of this variation of extracted flow rate on the operation of the gas collection and treatment center is then limited.

Many alternatives of this automated control process may be implemented within the framework of the invention, for example:

flexible sleeve 50 provided with a valve system 52 with proportional opening may be replaced by a device of the hydraulic actuating cylinder type, adapted to raise the lid of peephole 11' to partially or completely open peephole 11'. The device may be controlled by control unit 54;

the temperature measurement used for comparison and for ordering peephole 11' to open may advantageously be made downstream of peephole 11' so as to directly control the impact of the opening of peephole 11' on the temperature of gases in the first natural pre-heating zone Z1 and therefore on the temperature rise of the anodes in this first natural pre-heating zone Z1; this temperature may be measured by means of a temperature gauge fitted to the furnace especially for this purpose or by means of a temperature gauge usually present currently at the level of suction leg 12; as shown in FIG. 9, the temperature curve measured in the suction leg and recorded 57' must then advantageously follow the reference temperature curve 59' after they cross, the percentage of opening of peephole 11' being calculated, for example, by means of a PID regulator; the temperature curve measured in the suction leg and recorded may also advantageously follow a specific reference temperature curve throughout the cycle;

the temperature is measured at least two distinct points of the partition (for example downstream and upstream of peephole 11'), and each measurement is compared with a distinct corresponding reference value so that two comparisons weight the action to be triggered, which makes it possible to improve the accuracy of the regulation still further.

parameters such as the suction flow rate, the temperature of the outside air, the alignment of the degassing front, etc. may also be taken into account to determine the reference value used for the comparison.

The various characteristics presented above independently for the manual mode and the automated mode may be combined differently while remaining within the framework of this invention.

As was observed during implementation of the manual control process for a few months, the opening of peepholes occurs at relatively regular time intervals in the cycle so that it is possible to order the opening of peepholes 11' on the basis of the baking cycle as it moves forward in time. Also, it would have been possible to control the furnace described above operating on a 36-hour cycle basis, ordering the opening of peepholes 11' six hours before the end of the baking cycle.

In a second mode of implementation of the process according to the invention, at least some of the gases, and therefore some of the gas flow leaving the second natural pre-heating zone Z2 is diverted outside the hollow partitions 4 so that those gases that are diverted outside the hollow partitions do not pass through the first natural pre-heating zone Z1 and are not therefore involved in the temperature rise of partitions 4 and carbonaceous blocks 17 in the first natural pre-heating zone Z1.

Figure 10:
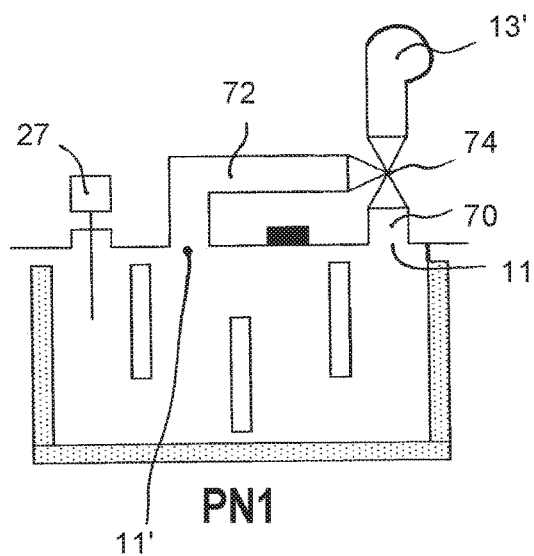
FIG. 10 is a detailed schematic side view of a portion of the furnace partitions in an example of an automatic implementation of a second embodiment according to the invention.

According to an advantageous embodiment of the invention shown schematically in FIG. 10, the downstream suction ramp 13' comprises, for each partition, a first suction leg 70 and a second suction leg 72 and a valve system 74. The first suction leg 70 is installed as usual on a peephole 11 placed downstream of the first natural pre-heating zone Z1 and the second suction leg 72 is installed on a peephole 11' placed between the first natural pre-heating zone Z1 and the second natural pre-heating zone Z2. In the example in FIG. 10, the separation between the first natural pre-heating zone Z1 and the second natural pre-heating zone Z2 is in PN1 on peephole 11' directly downstream of measurement ramp 27. It is then possible to order the valve system 74 so as to control the gas flow rate passing through the first natural pre-heating zone Z1 and sucked in by the first suction leg 70, and the gas flow rate leaving the hollow partitions via peephole 11' and sucked in by the second suction leg 72.

An example of implementation of the process according to the invention involves, for example, maintaining a constant, predetermined level of opening between the first suction leg 70 and the second suction leg 72 throughout the cycle so that the gases sucked in by the second suction leg 72 throughout the cycle are not involved in the temperature rise of anodes 17 in the first natural pre-heating zone Z1.

The valve system 74 may also, as presented above in reference to the first embodiment, be ordered by a control unit for example from a comparison between a measured temperature and a reference temperature, or from time programming.

All the gases leaving the second natural pre-heating zone Z2 may for example be sucked in by the first suction leg 70 at the beginning of the cycle then the valve system 74 ordered to modify this distribution of gases sucked in by the first and the second suction leg according to the measured temperature rise of the gases.

In one particular embodiment, all the gases leaving the second natural pre-heating zone Z2 are sucked in by the second suction leg 72 at the beginning of the cycle, then all the gases leaving the second natural pre-heating zone Z2 are sucked in by the first suction leg 70. A particular embodiment of this kind has the advantage that it can be implemented on a known furnace, i.e. with a suction ramp comprising a single suction leg. To do this, the downstream suction ramp is not moved with the rest of the rotating heating system at the end of a baking cycle but this movement of the downstream suction ramp is delayed. Therefore, at the beginning of cycle, before movement of the downstream suction ramp, the single suction leg corresponds to the second suction leg through which all the gases leaving the second natural pre-heating zone Z2 pass; then, during the cycle, after movement of the suction ramp, the single suction leg corresponds to the first suction leg through which all gases leaving the second natural pre-heating zone pass. Movement of the downstream suction ramp is, for example, ordered from a reference time predetermined, for example, by calculation or experimentation.

It goes without saying that the invention is not limited to the embodiments described above by way of examples, but encompasses all embodiment variants.

The invention claimed is:

1. A control process for a furnace for baking carbon anodes for production of aluminum by electrolysis, the furnace including:
   longitudinal hollow partitions in each of which a hot baking gas flow may circulate at a certain flow rate and at a certain temperature, the hollow partitions defining together in-between cells to receive the anodes to be baked and including a plurality of peepholes; and
   a heating system, rotating in relation to the hollow partitions, which comprises an upstream ramp of several blowing legs blowing air into the various hollow partitions, a downstream ramp of several suction legs sucking gas from the various hollow partitions and, between said upstream and downstream ramps, at least one heating ramp equipped with at least one burner or at least one fuel injector per hollow partition; and
   lines for gas flows to circulate in the hollow partitions, the lines being formed in the hollow partitions between the blowing legs and the corresponding suction legs;
   wherein the process comprises:
   pre-heating the hollow partitions and anodes in a natural pre-heating phase during which the anodes release combustible volatile matter which burns inside the hollow partitions forming a degassing front to pre-heat the gas flows, the hollow partitions and the anodes, this natural pre-heating phase being carried out in a natural pre-heating zone of the furnace downstream of the heating ramp, wherein the natural pre-heating zone is divided into at least one first natural pre-heating zone located at a first distance from the heating ramp and a second natural pre-heating zone located at a second distance from the heating ramp, the first distance being larger than the second distance; and
   controlling a location of the degassing front relative to the downstream ramp, comprising controlling gas flows passing through the first natural pre-heating zone from gas flows leaving the second natural pre-heating zone to regulate a rise in temperature of the hollow partitions and the anodes in the first natural pre-heating zone, such that the first natural pre-heating zone has a different temperature control mode from the second natural pre-heating zone, by reducing a temperature of the gas flows leaving the second natural pre-heating zone before the gas flows pass through the first natural pre-heating zone, thereby controlling the location of the degassing front independently of a gas flow rate and a temperature in locations upstream of the first natural pre-heating zone.

2. The process according to claim 1, wherein reducing the temperature of the gas flows leaving the second natural pre-heating zone comprises introducing into the hollow partitions outside air coming from outside the hollow partitions between the first and the second natural pre-heating zone.

3. The process according to claim 1, in which peepholes placed between the first and the second natural pre-heating zone are fully or partly opened to reduce the temperature of the gas flows leaving the second natural pre-heating zone by inputting outside air.

4. The process according to claim 2 in which the gas flow rate sucked in by the suction legs is increased to maintain the flow rate of the gas flows leaving the second natural pre-heating zone during introduction of outside air or when the peepholes are opened.

5. The process according to claim 3, in which the peepholes placed between the first natural pre-heating zone and the second natural pre-heating zone are provided with a valve system and in which the valve system is actuated to open peepholes.

6. The process according to claim 3, in which opening of the peepholes is varied in time.

7. The process according to claim 1 including:
   a) for each line, measuring the temperature at at least one given point of the natural pre-heating zone;
   b) comparing the temperature measured with a corresponding reference;
   c) ordering an action for the reducing the temperature of the gas flows leaving the second natural pre-heating zone before passing through the first natural pre-heating zone according to a result of the comparing carried out at stage b).

8. The process according to claim 7, in which the temperature is measured in the first natural pre-heating zone and/or in the second natural pre-heating zone.

9. The process according to claim 7, in which peepholes placed between the first and the second natural pre-heating zone are fully or partly opened to cool the gas flows leaving the second natural pre-heating zone by inputting outside air, and an opening percentage of each of the peepholes depends of the result of the comparing carried out at stage b).

10. The process according to claim 7, in which the reference for the comparing carried out at stage b) is a law expressing the temperature according to time.

11. The process according to claim 1, including ordering of an action for the reducing the temperature of the gas flows leaving the second natural pre-heating zone before passing through the first natural pre-heating zone as a function of time.

12. The process according to claim 1, in which a plurality of flexible sleeves provided with a valve system for opening and closing peepholes is installed on the peepholes of the furnace.

13. A control process for a furnace for baking carbon anodes for production of aluminum by electrolysis, the furnace including:
- longitudinal hollow partitions in each of which a hot baking gas flow may circulate at a certain flow rate and at a certain temperature, the hollow partitions defining together in-between cells to receive the anodes to be baked and including a plurality of peepholes; and
- a heating system, rotating in relation to the hollow partitions, which comprises an upstream ramp of several blowing legs blowing air into the various hollow partitions, a downstream ramp of several suction legs sucking gas from the various hollow partitions and, between said upstream and downstream ramps, at least one heating ramp equipped with at least one burner or at least one fuel injector per hollow partition; and
- lines for gas flows to circulate in the hollow partitions, the lines being formed in the hollow partitions between the blowing legs and the corresponding suction legs;

wherein the process comprises:
- pre-heating the hollow partitions and anodes in a natural pre-heating phase during which the anodes release combustible volatile matter which burns inside the hollow partitions forming a degassing front to pre-heat the gas flows, the hollow partitions and the anodes, this natural pre-heating phase being carried out in a natural pre-heating zone of the furnace downstream of the heating ramp, wherein the natural pre-heating zone is divided into at least one first natural pre-heating zone located at a first distance from the heating ramp and a second natural pre-heating zone located at a second distance from the heating ramp, the first distance being larger than the second distance; and
- modifying gas flows circulating in the hollow partitions during the natural pre-heating phase so as to control gas flows passing through the first natural pre-heating zone from gas flows leaving the second natural pre-heating zone to regulate a rise in temperature of the hollow partitions and the anodes in the first natural pre-heating zone and control a location of the degassing front, such that the first natural pre-heating zone has a different temperature control mode from the second natural pre-heating zone, wherein modifying the gas flows comprises diverting at least part of the gas flows leaving the second natural pre-heating zone outside the hollow partitions.

14. The process according to claim 13, in which the downstream ramp comprises, per hollow partition, a first gas suction leg and a second gas suction leg provided with a valve system, and in which the first suction leg is fitted onto a peephole placed downstream of the first natural pre-heating zone and the second suction leg on a peephole placed between the first natural pre-heating zone and the second natural pre-heating zone.

15. The process according to claim 14, in which the valve system is controlled so as to regulate the flow rate of the gas flows passing through the first natural pre-heating zone.

16. The process according to claim 13, in which movement of the downstream ramp is delayed in relation to the rest of the heating system to divert the gas flows leaving the second natural pre-heating zone outside the hollow partitions.

17. The process according to claim 1, implemented on a furnace with hollow partitions without baffles.

18. The process according to claim 1, implemented on a furnace operating with cycles longer than 33 hours.

19. A furnace for baking carbon anodes for production of aluminum by electrolysis including:
- longitudinal hollow partitions in each of which a hot baking gas flow may circulate at a certain flow rate and at a certain temperature, the hollow partitions defining together in-between cells to receive the anodes to be baked and including a plurality of peepholes; and
- a heating system, rotating in relation to the hollow partitions, which comprises an upstream ramp of several blowing legs blowing air into the various hollow partitions, a downstream ramp of several suction legs sucking gas from the various hollow partitions and, between said upstream and downstream ramps, at least one heating ramp equipped with at least one burner or at least one fuel injector per hollow partition;
- lines for gas flows to circulate in the hollow partitions being formed in the hollow partitions between blowing legs and corresponding suction legs;
- a natural pre-heating zone of the furnace being defined downstream of the heating ramp on which the anodes release combustible volatile matter which burns in the hollow partitions, forming a degassing front to pre-heat the gas flows, the hollow partitions and the anodes, this natural pre-heating zone being divided into at least one first natural pre-heating zone located at a first distance from the heating ramp, and a second natural pre-heating zone located at a second distance from the heating ramp, the first distance being greater than the second distance, and,
- wherein the furnace is adapted for implementation of a process including pre-heating the hollow partitions and anodes in the natural pre-heating zone in a natural pre-heating phase, forming the degassing front, and controlling a location of the degassing front relative to the downstream ramp, comprising controlling gas flows passing through the first natural pre-heating zone from gas flows leaving the second natural pre-heating zone to regulate a rise in temperature of the hollow partitions and the anodes in the first natural pre-heating zone, by reducing a temperature of the gas flows leaving the second natural pre-heating zone before the gas flows pass through the first natural pre-heating zone,
- wherein the furnace further comprises:
  - means of temperature measurement in the natural pre-heating zone, comprising a temperature measurement ramp positioned upstream from the first natural preheating zone and downstream from the heating ramp;
  - means of analysis able to compare the temperature with a corresponding reference; and
  - means of control able to order an action for cooling the gases passing through the first natural pre-heating zone according to a result of the comparing carried out by the means of analysis,
- wherein the second natural pre-heating zone begins directly downstream from the heating ramp, and no additional air entry is provided in the second natural pre-heating zone.

20. The furnace according to claim 19, comprising means of cooling able to reduce the temperature of the gas flows leaving the second natural pre-heating zone before they pass through the first natural pre-heating zone.

21. The furnace according to claim 20, in which the means of cooling include the peepholes that can be opened or flexible sleeves inserted in the peepholes and provided with a valve system to adjust a percentage of opening of each of the peepholes.

22. The process according to claim 1, wherein reducing the temperature of the gas flows leaving the second natural pre-heating zone comprises adding a coolant into the gas flows leaving the second natural pre-heating zone.

23. The process according to claim 1, wherein the first natural pre-heating zone is defined in a first section of the natural pre-heating zone adjacent to the downstream ramp.

24. The process according to claim 1, wherein the furnace further comprises a temperature measurement ramp positioned upstream from the first natural preheating zone and downstream from the at least one heating ramp, and wherein reducing the temperature of the gas flows leaving the second natural pre-heating zone before the gas flows pass through the first natural pre-heating zone is performed downstream of the temperature measurement ramp.

25. The process according to claim 1, wherein controlling the location of the degassing front relative to the downstream ramp includes limiting advancement of the degassing front toward the downstream ramp.

* * * * *